Nov. 7, 1933.　　　　S. T. WILES　　　　1,934,634
APPARATUS FOR ELECTROTHERMIC REDUCTION OF ORES
Original Filed Nov. 3, 1930　　6 Sheets-Sheet 4

Inventor
Sydney T. Wiles,
By Barton A. Bean Jr.
Attorney

Nov. 7, 1933. S. T. WILES 1,934,634
APPARATUS FOR ELECTROTHERMIC REDUCTION OF ORES
Original Filed Nov. 3, 1930  6 Sheets-Sheet 6

Inventor
Sydney T. Wiles,
By Barton A. Bean Jr
Attorney

Patented Nov. 7, 1933

1,934,634

UNITED STATES PATENT OFFICE 1,934,634

APPARATUS FOR ELECTROTHERMIC REDUCTION OF ORES

Sydney T. Wiles, Buffalo, N. Y., assignor to Buffalo Electric Furnace Corporation, Buffalo, N. Y.

Application November 3, 1930, Serial No. 493,146
Renewed January 30, 1933

18 Claims. (Cl. 13—9)

This invention relates to apparatus for the electrothermic reduction of iron ores or similar compounds, and more particularly to apparatus wherein ore, finely divided and homogeneously admixed with a reducing agent, such as charcoal and a fluxing agent, such as lime, is introduced into a closed tube leading directly into an electric arc, the finely divided materials being protected from blasts of waste gases until reduced to such condition as to be substantially metalliferous in character.

The invention contemplates improved means for practicing electrothermic processes such as are disclosed in my copending application, Serial No. 374,251, filed June 27, 1929, insofar as these processes relate to the introduction of a finely divided mass of material through a horizontally disposed hollow electrode into an electric arc furnace. Briefly described the apparatus comprises a furnace having horizontally opposed hollow electrodes, means for creating an electric arc in the furnace between the ends of the electrodes, and means for feeding the finely divided charge under controlled conditions through the electrodes and into the furnace.

The present invention further comprehends the provision of sectional electrodes, adjustably mounted for longitudinal movement on releasable electrode carriages, and actuating means for the carriages, whereby the arc between opposing electrodes may be shifted longitudinally to desired positions between the furnace walls, and whereby new electrode sections may be quickly added from time to time without interrupting for any extended period of time the otherwise continuous operation of the furnace. Means are also provided for excluding air from the furnace and for collecting the furnace gases, (primarily carbon monoxide), and for re-introducing a portion of them into the charge feed lines for increasing the fluency of the charge and aiding in its reduction in the electrodes. Agitating means are also utilized for maintaining the charge in a suitable condition for continuous feeding into the furnace at a constant rate. Insulating means for electric currents and also for electro-magnetic currents have been incorporated in the furnace and electrode feed and carriage devices to decrease electrical and magnetic losses and increase the overall electrothermal efficiency of the apparatus.

These and other aspects will appear in the following description of typical apparatus embodying the principles of the invention, the construction illustrated being particularly adapted for the reduction of metalliferous ores and utilizing three pairs of electrodes, each electrode having a capacity of approximately five to ten pounds of charge per minute, depending upon the fluidity and composition of the charge used.

In the accompanying drawings, which form a part of the description.

The apparatus includes a mixing unit, indicated generally at A, for homogeneously mixing the charge constituents and forcing them, together with gases for increasing the fluidity of the charge, through charge feed lines B to the furnace pumping or charging units C. The charge is pre-heated in the feed lines to reduce the El consumption of the electric furnace D and to prepare the charge for quick reduction. The charging units C are adapted to pump the charge through hollow, horizontal electrodes of the furnace D, reducing gases being admixed with the charge before passage thereof through the electrodes. The charge is reduced in the electrodes by the action of heat and the reducing gases, the reduced metal dropping through the electric arcs at the inner ends of the electrodes into the furnace hearth. The gaseous products of combustion are collected and compressed by means indicated generally at E for re-introduction into the furnace, where it serves as a reducing gas, or for other purposes.

Figure 1:
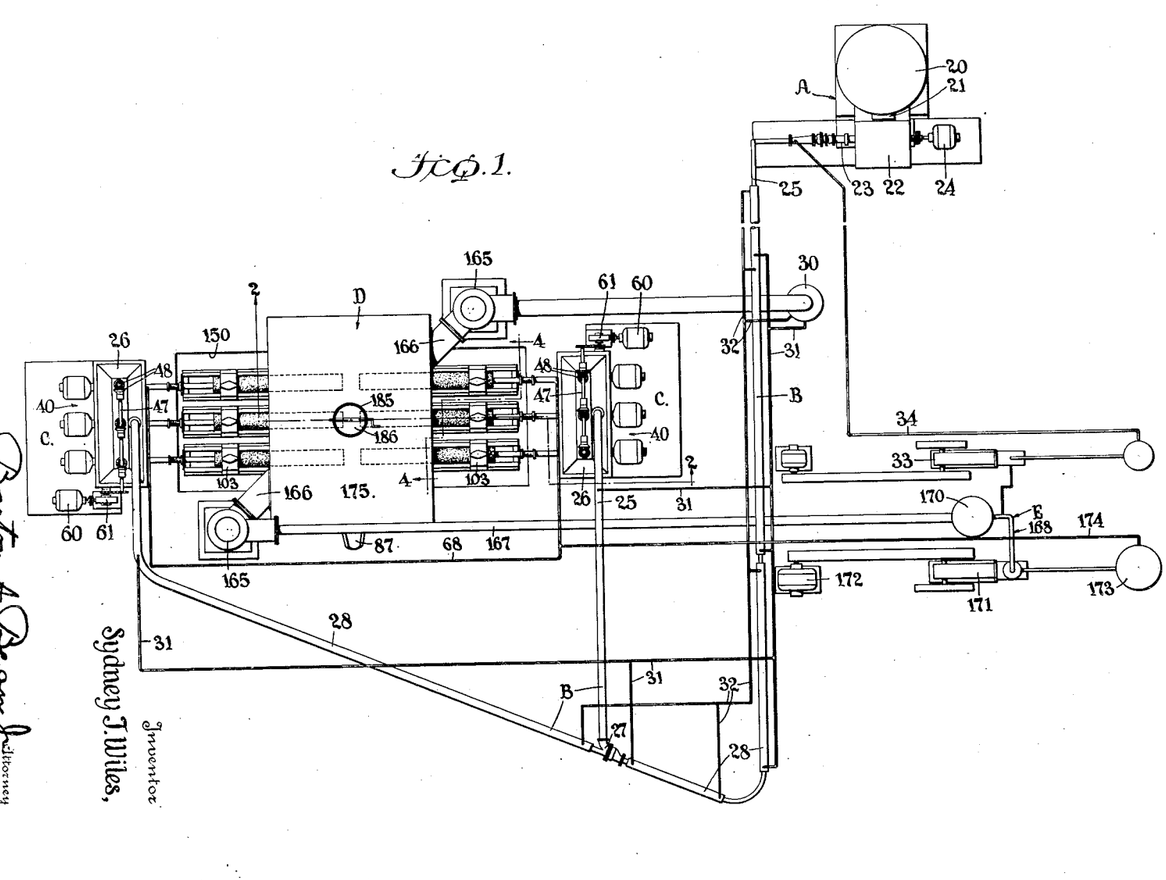
Fig. 1 is a plan view showing the general arrangement of the apparatus.

As shown in Fig. 1, the mixing unit comprises a mixing bin 20, into which finely divided ore, reducing agent, and flux are placed in proper proportions and mixed to a homogeneous mass which constitutes the furnace charge. The contents of the bin 20 may be discharged through a chute 21 into a hopper 22 which is superposed on a screw pump or conveyor 23, operated by a motor 24, which pumps or forces the charge at any predetermined and desired speed through a charge feed line 25 to charging hoppers or bins 26, arranged on opposite sides of the furnace. The line 25 is divided into two branches, as indicated by the reference numeral 27, and is maintained at a constant and elevated temperature by packing 28 which encases the feed lines and steam lines associated with a suitable boiler 30, the steam supply lines being indicated at 31 and the return lines at 32. Gas is supplied under pressure by the motor-compressor unit 33 and the gas line 34, to the feed line 25 adjacent the pump 23 to increase the fluency of the charge. The constant temperature preserved in the feed lines by the packing and steam lines serves to maintain a constant condition of fluidity of charge and to prevent possible freezing thereof in cold weather.

As best depicted in Figs. 1, 2, 5 and 6, the furnace charging units C into which the feed lines 25 discharge comprise upper hopper portions 26 and lower pumping units 40. Since the charging units on both sides of the furnace are substantial duplicates only one of these need be described. The hopper and pumps are supported by a suitable frame work 41, the pumps being three in number (one for each electrode) and spaced from the frame by insulating material 42. The feed lines 25 open into the tops of the hoppers 26, keeping the latter constantly filled with charging materials which are maintained in a fluent condition by agitators 43, one of which is disposed above each pump unit and which each comprise a plurality of pairs of arms 44, fixed to a rotatable shaft 45 journalled to the hopper at 46, and driven by a transverse shaft 47, through the agency of the bevel gears 48.

The charge is gravity fed through slide valves 50 into feed control chambers 51, there being one of these for each pump, and from which the charge is discharged at a desired and predetermined rate to the pump chambers 52, the casing of the latter being electrically insulated from the superposed parts by insulating gaskets 53. A rotor 54 having an undulated periphery is disposed between pivoted guide plates 55 in the control chamber 51, the plates serving to limit the material conveyed by the rotor to that which is contained in the undulations on its periphery so that on each revolution of the rotor a predetermined quantity of charge is dropped into the pump chamber 52. The rotor is mounted on a shaft 56 which is driven from a shaft 57 by means of sprockets and an endless chain 58, the shaft in turn being actuated by a motor 60 through a speed reducer 61. (Fig. 1.)

Each of the pump chambers 52 houses a screw 62 rotated by an individual motor 63 suitably supported on the frame 41 for forcing the charge from the chambers through tubes 64 and 65, an insulating coupling member 66 and the electrode feed pipe 67. The member 66 is made of electrical insulating material and is together with the abutting ends of the members 65 and 67 provided with quick detachable means 69 whereby the members 65 and 67 may be quickly connected and disconnected, for a purpose to be hereinafter explained. A gas pressure line 68, having an interposed insulating coupling 70, is connected to the member 65 for supplying gas for admixture with the charge forced through to the member 67 by the pump means 62. This line is forked at 71 to supply additional gas to the charge at the end of the pump 72. Other small leads 73 are taken from the forked line 71 to apply pressure at the pump shaft bearings 74 and 75. The gas lines are provided with suitable gauges 76 and valves 77, whereby the gas pressure may be determined and regulated at all times.

Figure 3:
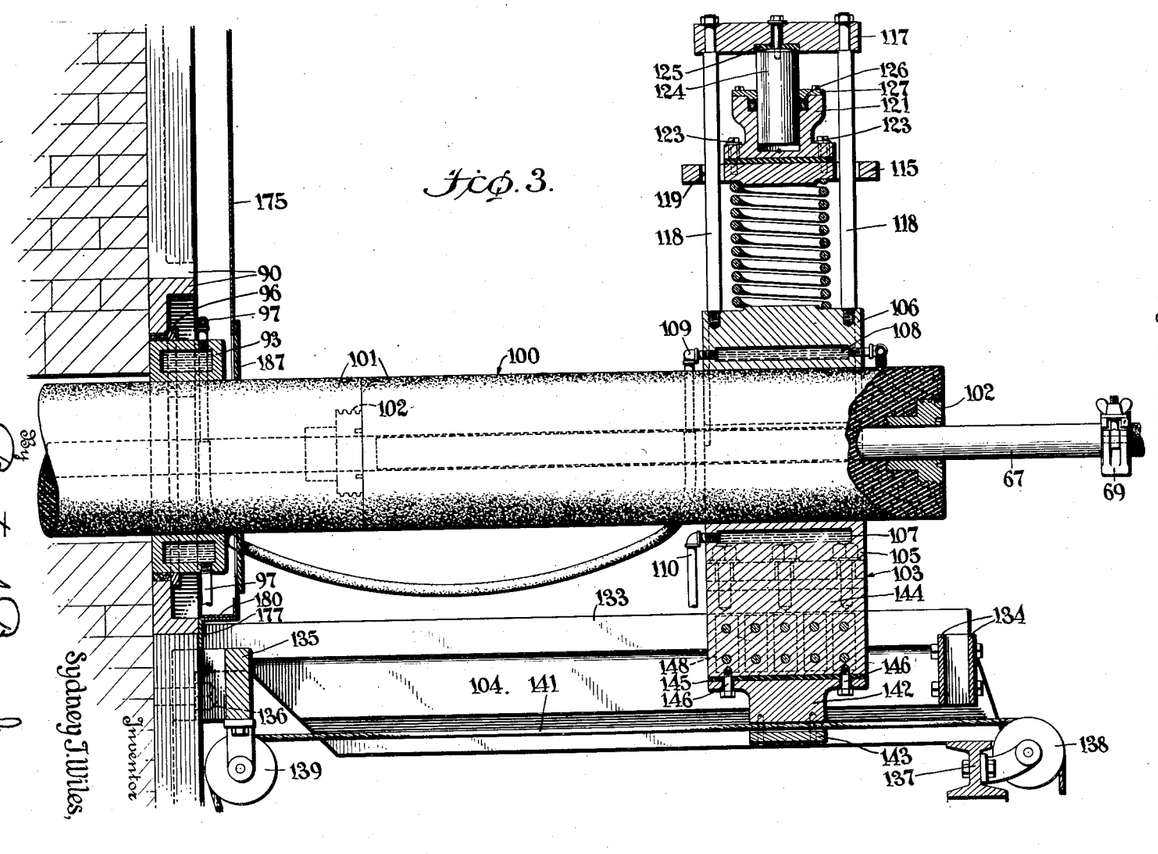
Fig. 3 is an enlarged longitudinal cross-sectional view taken through an electrode carriage and a portion of the furnace wall, and showing the details thereof, including the electrode release means on the carriage.
Figure 4:
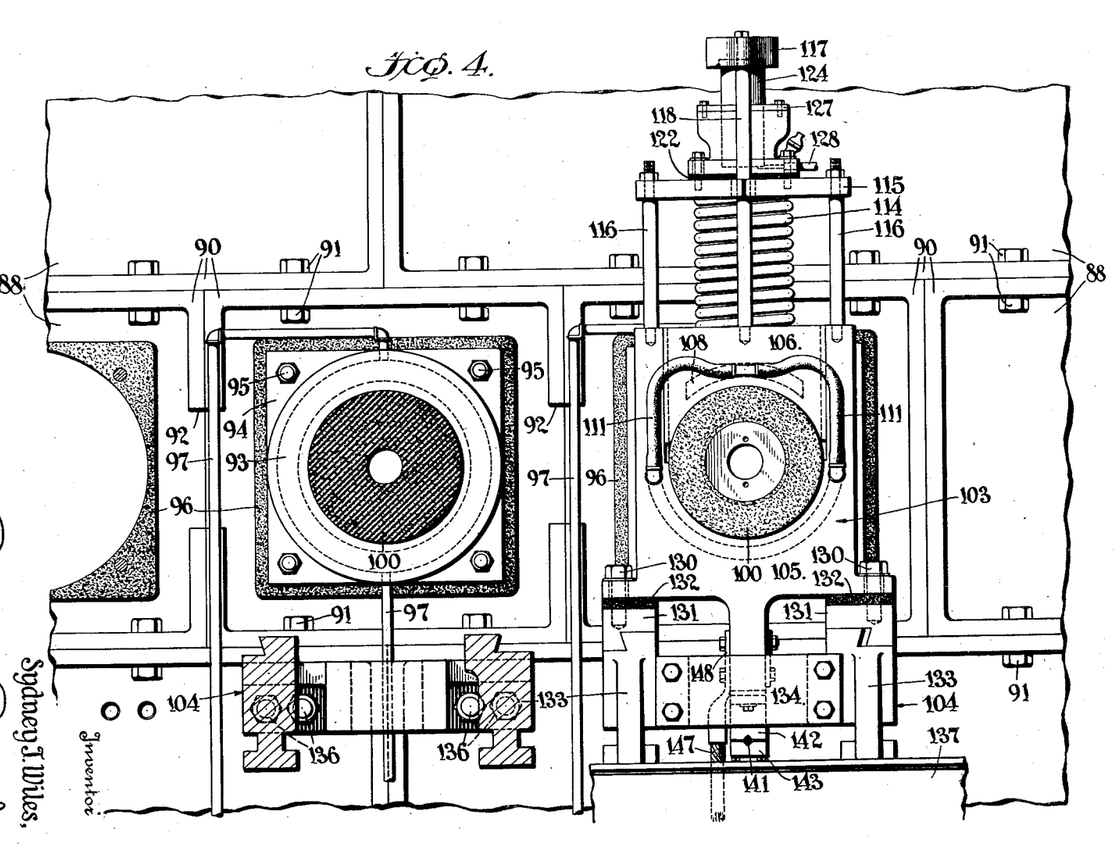
Fig. 4 is an enlarged vertical sectional view taken on line 4—4 of Fig. 1 showing the furnace with the hood removed.
Figure 5:
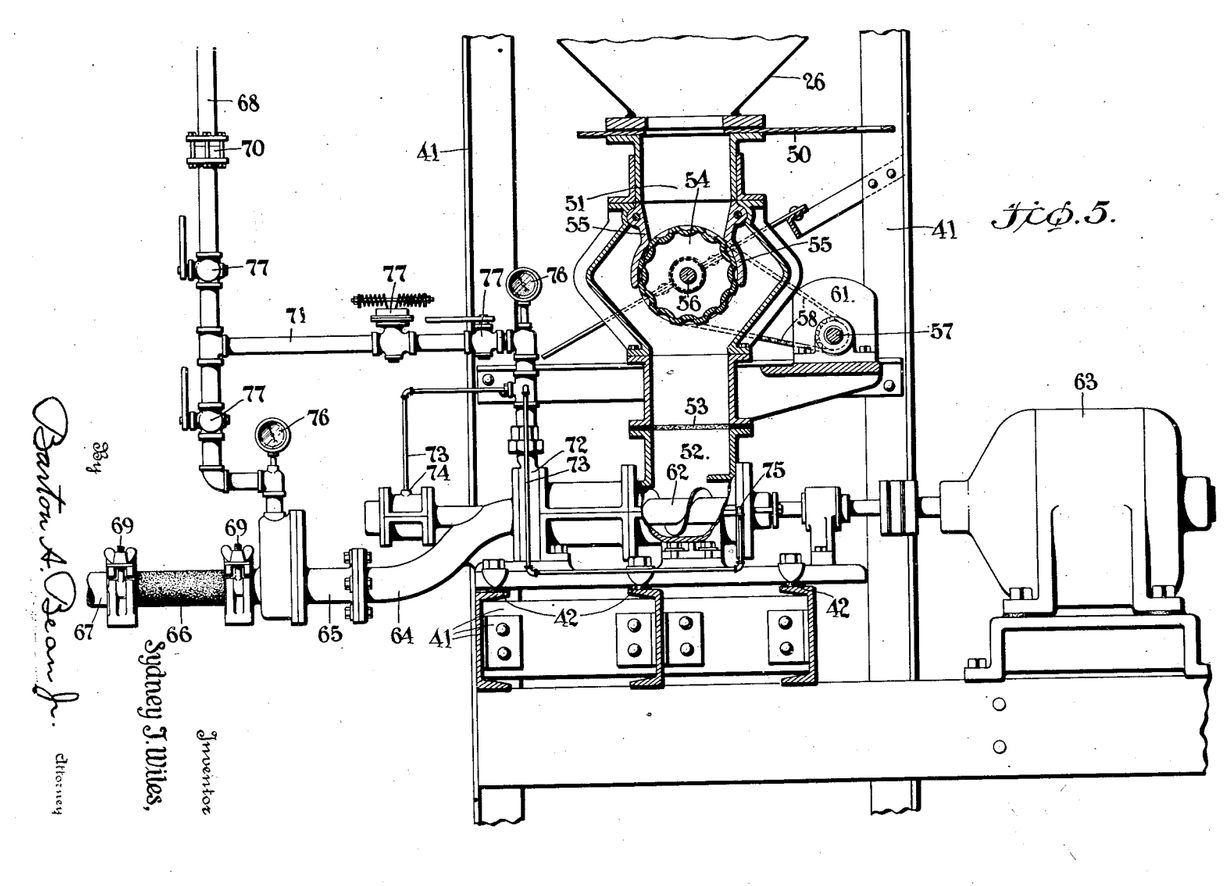
Fig. 5 is an enlarged detail view of the lower part of the charge feed means including charge pumps, parts thereof being broken away and parts being shown in cross-section.
Figure 6:
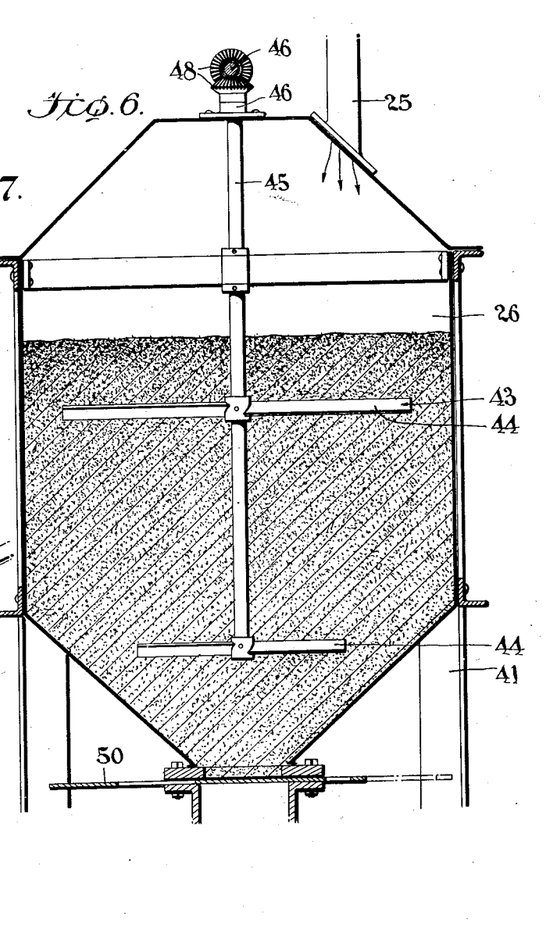
Fig. 6 is an enlarged detail view of the upper part of the charge feed device showing agitating means for maintaining the supply of charge to the charge pumps.

The furnace D comprises a metal casing 80 which is mounted on a concrete foundation 81, and it includes fire brick side, top and bottom walls 82, 83 and 84 respectively. The bottom or hearth of the furnace is provided with a refractory lining 85, which may be silica, chromite, magnesite, or other like material, although my preference at present is for chromite, it being found satisfactory in operation. Openings 86 fitted with closures are provided in the walls 82 for observation of the furnace interior and for pulling out slag. Another orifice is formed through the front side walls at the level of the hearth bottom and is provided with a trough 87, shown in Fig. 1, through which molten metal or alloy accumulated on the hearth may be poured from the furnace. The casing 80 is built up of rectangular sections 88, having flanges 90, through which bolts 91 are passed for securing the sections together. Three adjacent sections 88 on each side of the furnace are formed with openings to receive the electrodes as shown in Figs. 3 and 4. The flanges of these sections are cut away at 92 to avoid continuous rings about the electrodes in which magnetic currents would be set up by the passage of electric currents through the electrodes, the cut away portions thus reducing electrical losses and increasing the overall efficiency of the apparatus.

Hollow annular castings 93, having flange portions 94 through which bolts 95 extend for securing the castings to the casing sections 88, are provided for supporting the electrodes adjacent the furnace and insulating members 96 are placed between the sections and members 93 to prevent grounding of electrical currents passing through the electrodes. The castings 93 are water cooled, suitable water lines 97 being provided for communication with the hollow casing interiors. The hollow electrodes 100, each made up of a plurality of similar sections 101 having interthreaded male and female ends 102, are supported at their outer ends by electrode carriages 103 movable longitudinally of the electrode axes on beds 104. The bore of each electrode is of sufficient diameter to slidably receive an electrode feed pipe 67, which extends from the coupling 69 to a point in the electrode adjacent to the outer face of the furnace wall as shown in Fig. 3.

Figure 2:
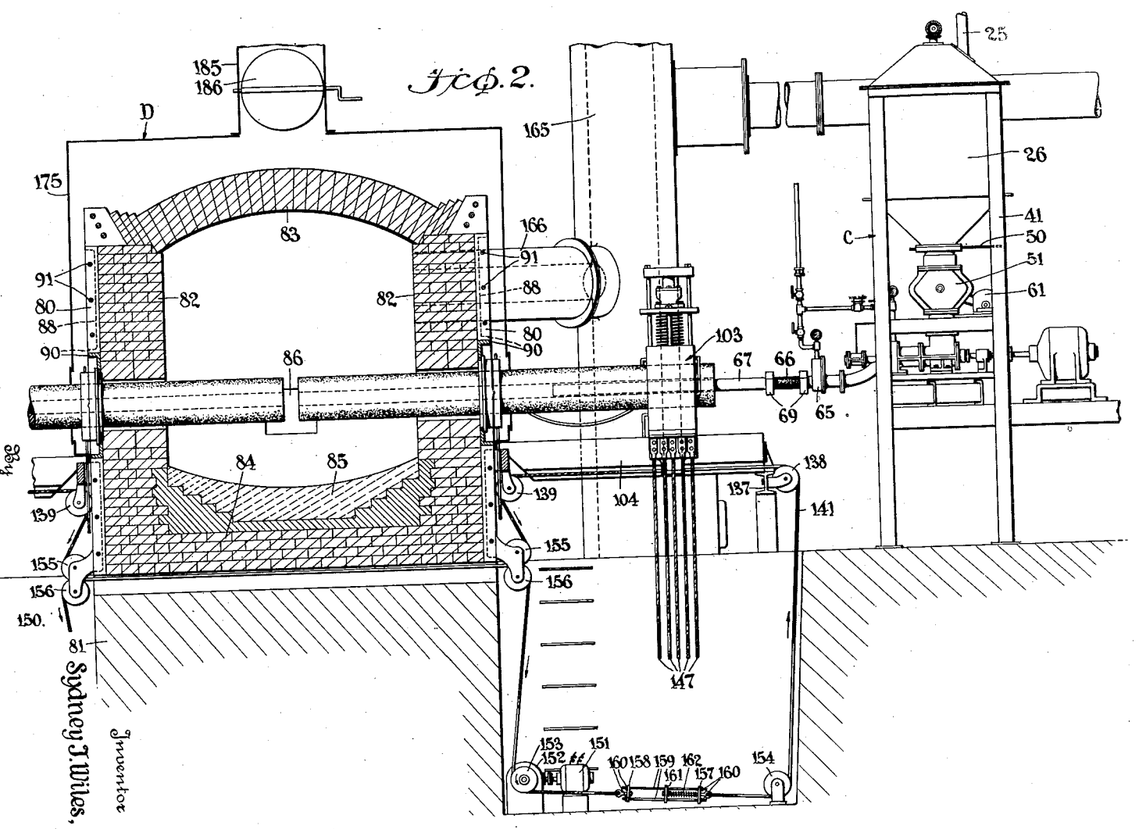
Fig. 2 is a view taken on line 2—2 of Fig. 1 longitudinally of the electrodes, showing the furnace proper in cross section and the electrode carriage, carriage feed, and charge feed mechanism in side elevation.

Each carriage 103 comprises a substantially U-shaped saddle member 105 having a central semicylindrical surface for seating the electrode, and a clamp member 106 slidably retained by the upright side members of the saddle member, which serve as vertical guides for the clamp member. These members 105 and 106 are formed with interior cavities 107 and 108, respectively, through which cooling water is passed by way of communicating water tubes 109, 110 and 111, the tube 109 connected to the clamp member preferably having a flexible portion as does the tube 111 which communicates with both cavities. The clamp 106 is normally pressed downwardly for clamping the electrode against the saddle by a coiled spring 114 backed by a cross-head 115 which, as shown in Fig. 4, is tied to the upright portions of the saddle by rods 116. A similar cross-head 117 above the cross-head 115 is fixed to the clamp member by vertical rods 118 which pass through apertures 119 in the member 115. A hydraulic cylinder 121 is secured to the head 115, being spaced by a sheet of insulating material 122, by insulated bolts 123. A piston 124 fitting the cylinder bore is similarly mounted to the cross-head 117, being spaced therefrom by insulation 125. The upper end of the cylinder is recessed to receive packing 126, which is held in place by a plate 127. Fluid, under pressure, may be applied to the cylinder through fluid line 128, by means of which the piston 124 may be raised, lifting the clamping member 106 against the compression of the spring 114, and thereby releasing the electrode. The saddle member 105 is secured by insulated bolts 130 to carriage guide bars 131 from which it is spaced by insulating members 132. The bars 131 are slidable on side rails 133 of the rectangular frame which constitutes the carriage bed 104. As indicated in Fig. 3 a front portion of the frame is cut out and bridged by copper strips 134 to eliminate the induction of electro-magnetic currents into the otherwise closed frame-work. The rear portion of the frame has an outward offset at 135 to clear the ribs or flanges 90 of the casing sections 88, the frame 104 being secured at its rear to the sections 88 below the electrode sections by bolts 136 and being supported at its forward end by a steel frame-work 137. On the latter are mounted sheaves 138, one for each electrode carriage, while similar sheaves 139 are mounted upon the rear portion of each frame 104, as shown in Figs. 2 and 3. These sheaves support a cable 141 for moving the electrode carriages, being held between upper and lower clamping members 142 and 143, as shown in Figs. 3 and 4, the member 142 being spacedly secured to a depending portion 144 of the saddle 105 by insulation 145 and bolts 146. Cables 147 for conducting electricity from an available source to the electrodes are provided with flat terminal plates 148 which are attached to the portion 144.

As shown in Figs. 1 and 2, a pit 150 is formed at either side of the furnace for containing the cable actuating units, these comprising three motors 151, sets of reduction gears 152 and cable drums 153, a cable being wound several turns about each of the latter. Each cable, following the arrows in Fig. 2, extends from a winding drum 153, under a sheave 154 in the pit bottom, over sheave 138 on the frame 137, through the carriage members 142, 143, over sheave 139, under a sheave 155 mounted on the furnace casting 80, under the furnace, over a sheave 156 also mounted on the furnace casing, and so on through a similar but opposed course on the left hand side of the furnace, returning under the furnace, over sheave 156, and downwardly to the drum 153. One or more take-up or adjusting units are provided on each cable, these units comprising opposed cross-heads 157 and 158, the latter one being secured to the cable, the both heads being adjustably held on guide bars 159 by nuts 160 threaded to the bars. Another cross-head 161 secured to the opposite end of the cable is slidable on the guide bars and is constantly urged toward the head 158 by a coiled spring 162.

The motors 151 are reversible and may be controlled both manually and automatically as desired. It will be understood that in counter-clockwise rotation of a motor driven drum 153, the cable will travel in the direction of the arrows in Fig. 2, moving the opposed pair of electrodes together while opposite rotation of the motor will move the electrodes simultaneously outward and apart. By adjusting the nuts 160 the effective length of the cable may be increased or shortened to effect proper tension, small irregularities in the tension being taken care of by the spring 162. Under automatic control, the motors are controlled by conventional solenoid switch means responsive to the current passing through the electrodes so that they are constantly maintained at the required distance apart for proper arcing, being automatically moved together if the gap is too large for a proper arc, and moved apart if the gap is too small. The arc may be spaced any desired distance from the furnace walls by release of the clamping member 106 by the hydraulic cylinder 121, such release permitting the carriage to be moved under manual control, free of the electrode which it normally holds, longitudinally thereof. Thus, if it is desired to move the arc to the right of the position shown in Fig. 2 (in the approximate center of the furnace) the electrode carriage on the right of the furnace will be released from clamping engagement with the electrode and the drums 153 rotated in a clockwise direction, moving the left hand electrode to the right, and as this movement is continued the left hand electrode will carry with it the right hand electrode. When the desired position is reached the pressure on the carriage cylinder is released, allowing the clamp member to re-engage the electrode and normal automatic operation may be resumed.

If by reason of one electrode being worn away, it is desirable to add a new electrode section, this may be done by releasing the detachable connections 69, removing the insulated coupling member 66, and withdrawing the feed pipe 67. A new section 101 may now be turned into threaded engagement, by means 102, with the outer electrode section, the feed pipe reinserted in the lengthened electrode and the coupling member 66 replaced. The carriage 103 may be released before or after the addition of the new section and moved by manually controlled actuation of the motor 151 to proper position, preferably near the outer end of the guideway 104 so as to afford maximum electrode feeding movement without again releasing the carriage.

Stacks 165 having suitable dampers (not shown) are provided at opposite sides of the furnace, being connected thereto by pipe sections 166. The stacks and pipe sections are preferably lined with heat resistant material to prevent burning of the stack casing. A pipe 167 connects the stack at the left hand side of the furnace (Fig. 1) with a compressor unit 168, comprising a gas scrubber 170, compressor 171, motor 172 and storage tank 173 by which furnace gases are drawn from the stack, cleaned of dust by the scrubber and fed under pressure through pipes 174 to the gas feed lines 68, as shown in Fig. 1.

Figure 7:
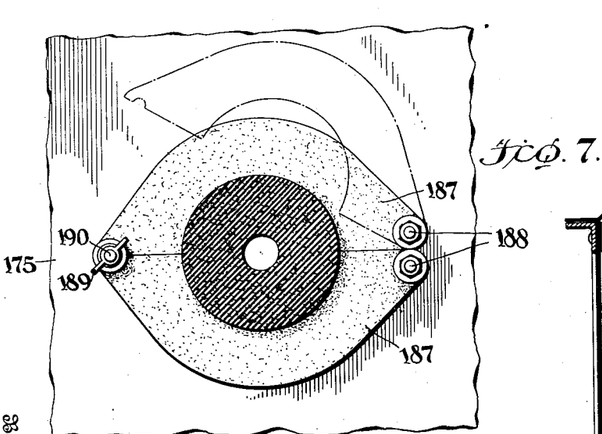
Fig. 7 and Fig. 8 are detail views depicting devices by which air may be excluded from the furnace proper and the furnace gases prevented from reaching the outside atmosphere.
Figure 8:
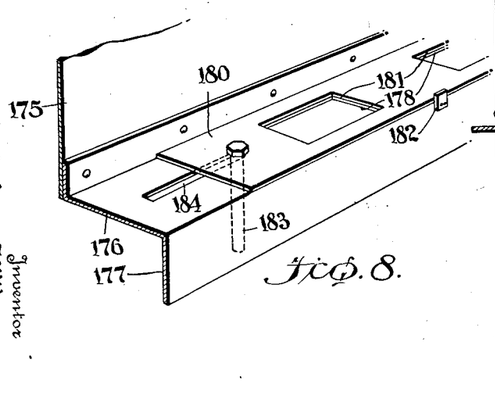

A hood 175 is disposed about the furnace as shown in Fig. 1, extending over the top and downwardly along the furnace side walls to a plane beneath the electrodes. In Fig. 8 is illustrated a Z-shaped member 176 for securing the hood 175 in spaced relation to the furnace proper, the flange 177 of the member 176 being in abutting relationship with the casing members 88. Elongated apertures or slots 178 are formed in the horizontal portions of the tie members and these may be covered and uncovered by a longitudinal movement of a strip 180 having apertures 181 registerable with the apertures 178. The strip 180 is guided for sliding movement over member 176 by lugs 182 secured to the flange 177, and may be moved by a manipulating stud 183 extending through an elongated slot 184 in the Z-bar 176. A stack 185, preferably equipped with a damper 186, is built on the hood to provide a regulated air draft therethrough. Sectional gasket members 187, shown in Figs. 3 and 7, are pivotally secured to the hood at 188 for fitting closely about the electrodes. The gasket sections are secured on the opposite side of the electrode by a wing nut 189, threaded to a stud 190 extending from the hood, the nut 189 being removable to allow the members 187 to be swung clear of the electrodes about the pivots 188 as shown in broken lines in Fig. 7.

During operation of the furnace a slight gas pressure equal to that existing in the furnace may be maintained within the hood by regulating the strip 180 by means of the stud 183, and by adjusting the stack damper, such pressure minimizing the tendency of furnace gases to escape from the furnace other than through the furnace flues or for outside air to seep into the furnace. Any furnace gases which may, however, leak from the furnace will be collected in the hood and carried away through the stack 185, thus eliminating the possibility of their poisoning workmen about the furnace.

In the operation of the apparatus described, metallic ore such as $Fe_2O_3$ (hematite), which may be of any grade such as that commonly known as flue dust, is ground to a fineness of about 40 mesh, and is homogeneously mixed in the mixing bin 20 with proper amounts of reducing material, which may comprise carbon in the form of coke or coal, and a flux, such as lime, the latter charge constituents also being ground to approximately 40 mesh. The charge is fed through the constantly heated feed line 25 by the pump 23 to the hoppers 26, the fluency of the charge during this movement being increased by the addition of gas, preferably carbon monoxide, supplied through the line 34. From the hoppers 26 the charge is carried by the control drums 54 at any desired rate to the pump chambers 52 and is thence forced through the electrodes by way of the feed pipe 67, by the pump means 62, being admixed during this movement with furnace gases that have been cleaned and compressed in the unit 168 and fed into the feed line through pipes 68 to the mixing elements 65 and 72.

While passing through the electrodes the charge is gradually heated, the temperature of heat ranging from approximately 700° C. at points adjacent the furnace walls to about 2500° C. at the point of arc. During passage through the electrode the ore is reduced, the chemical reaction in the exemplary charge being $$Fe_2O_3 + 3C \rightarrow 2Fe + 3CO$$

At the point of arc the reduced charge is melted and dropped into the furnace hearth 85 where the flux and impurities in the charge separate from the metal to form slag which floats above the mass of molten metal. It will be seen from the above equation that the furnace gas will be practically pure carbon monoxide which, as has been described, will be taken from the furnace, scrubbed, and introduced into the charge feed line, increasing the fluency of the charge and aiding in its further reduction. A portion of the gas may combine with the ore as $$3CO + Fe_2O_3 \rightarrow 2Fe + 3CO_2$$

The carbon dioxide thus formed will, at the high temperatures obtaining in the electrode, combine with the reducing agent as $$CO_2 + C \rightarrow 2CO$$

Since only a portion of the total of carbon monoxide produced in the furnace will be returned to the furnace, the remainder may be collected and used for other purposes and as such it will, being very pure CO, form a valuable by-product of the processes which may be practiced in the apparatus described.

In this apparatus it has been found that using six electrodes of 12" diameter with bores of 3", a charge of thirty to sixty pounds per minute can be satisfactorily reduced. As air is completely excluded from the furnace and charge, the electrodes show little tendency to oxidize when sufficient quantities of coke or other reducing agent are present. The metal or alloy reduced may be closely controlled as to carbon content, samples showing less than one half of one per cent having been produced. This may be accounted for by the fact that the final melting of the charge takes place in the arc so that little opportunity is afforded for contact of the molten metal with the electrode.

The current used in the electrodes may be either alternating or direct, each having certain specific advantages not obtainable in the other. It has been found that alternating current will effect a very slow wearing away of the electrodes and that the wear on opposing electrodes will be substantially even, whereas with direct current the wear on the cathode will be more rapid. The arc of direct curent, however, has the advantage of effecting both electro-thermal and electrolytic action on the charge, as compared with the purely electro-thermal action of alternating current.

It will be understood that the apparatus described may be used for producing many different metals, alloys and carbides with carbon monoxide as a by-product, or the apparatus may be used for the production of carbon monoxide alone by using a charge of coal, coke, or other carbonaceous material and by introducing oxygen or carbon dioxide with the charge into the furnace. It will be further understood that the apparatus herein described is merely exemplary of the principles of my invention, which it is intended shall be of scope commensurate with the appended claims.

What is claimed is:—

1. Apparatus for the electrothermic treatment of metalliferous materials comprising a furnace, horizontally disposed electrodes for the furnace, said electrodes having axially extending apertures formed therein, said electrodes extending exteriorly of the furnace, means exterior of the furnace for forcibly feeding solid material into the electrodes and into the furnace, and means exterior of the electrodes for withdrawing gases from the furnace at a pressure less than that exerted by said feeding means.

2. Apparatus for the electrothermic treatment of metalliferous substance comprising a furnace, horizontally disposed electrodes within the furnace projecting through the walls thereof, said electrodes being mounted for axial movement toward and away from the furnace, cooling means surrounding the electrodes, and means forming a fluid layer about the furnace and electrodes to prevent the passage of gaseous fluid between the contiguous portions of furnace walls and electrodes and the cooling means.

3. In combination with a furnace, an electrode extending into said furnace, a carriage for supporting said electrode and provided with means for releasably gripping and cooling said electrode, guide means for supporting said carriage for movement toward and away from said furnace, and electrically actuated cable means for moving said carriage on said guide means.

4. In combination with a furnace, a pair of axially aligned opposed electrodes extending into opposite sides of said furnace, a pair of carriages for supporting said electrodes and provided with means for releasably gripping and cooling said electrodes, guide means for supporting said carriages for movement toward and away from said furnace, means for correlating the movements of said carriages for moving them simultaneously in opposite directions, and reversible means for actuating said correlating means to effect movements of said electrodes.

5. In combination with a furnace, a pair of substantially horizontal and axially aligned, opposed electrodes extending into opposite sides of said furnace, an insulated carriage for carrying each of said electrodes, guide means for supporting said carriages for movements toward and away from said furnace, cable means for correlating said carriages for movements of equal distances in opposite directions, means for maintaining proper tension in said cable means, and reversible means for effecting movements of said cable means whereby said carriages and electrodes may be moved together or apart.

6. In combination with a furnace, a hollow electrode having one end extending into said furnace and comprising a plurality of sections attached end to end, a carriage and means for moving it in directions parallel to the axis of said electrode, said carriage having means for releasably gripping said electrode, a charge feed pipe slidable in said hollow electrode, charge feed means, and a detachable coupling associating said feed pipe and feed means, whereby said feed pipe may be disconnected from said feed means and said carriage disengaged from said electrode for attaching an additional electrode section to said electrode and for properly adjusting the position of the end of said added-to electrode within the furnace.

7. In combination with a furnace, a pair of opposed and aligned hollow electrodes having their adjacent ends disposed within the furnace, a carriage for each of said electrodes and means for moving said carriages in directions parallel to the axes of said electrodes, said carriages slidably supporting said electrodes and having means for releasably gripping said electrodes to hold said electrodes against sliding, and means for moving said carriages, whereby said carriages may by release of said gripping means be moved to various longitudinal positions relative to said electrodes and the adjacent ends of said electrodes adjusted to any desired position along their axes within said furnace.

8. In combination with a furnace, a hollow electrode and means for effecting axial movement of said electrode with respect to said furnace, charge feed means fixed with respect to said furnace, and a feed pipe slidable in said hollow electrode and detachably connected to said feed means, whereby said electrode may be moved relative to said furnace and feed means without effecting the continuous feeding of a charge through said feed pipe and hollow electrode and whereby said electrode may be disconnected from said feed means without disturbing the latter or said furnace.

9. Apparatus for the electrothermic treatment of a charge of metalliferous materials comprising a furnace, a hollow electrode extending into said furnace, a charge feed pipe extending into said hollow electrode, means for feeding a charge through said feed pipe and said hollow electrode, means for collecting gases in said furnace and for admixing them with the charge between said feed means and said feed pipe, whereby said charge and gases will be moved in an admixed condition through said hollow electrode.

10. Apparatus for the electrothermic treatment of a charge of metalliferous materials comprising a furnace, a hollow electrode extending horizontally into said furnace, means for feeding a charge through said electrode into said furnace at a predetermined rate, means for maintaining gases in said furnace at a predetermined pressure, and means for gathering said gases and for introducing them into said charge externally of said electrode and furnace at a pressure greater than the pressure maintained in said furnace.

11. Apparatus for the electrothermic treatment of a charge of metalliferous materials comprising a furnace, a pair of hollow electrodes extending horizontally into said furnace, means for inducing an electric arc between said electrodes, means for feeding a charge through said electrodes and through said arc whereby said charge will be gradually heated while passing through said electrodes, means for maintaining gases liberated in said furnace from said charge at a pressure greater than that of the atmosphere for preventing entrance of said atmosphere into said furnace, and means for collecting, compressing and for admixing said gases with said charge exteriorly of said furnace and electrodes, whereby said gases admixed with said charge will be gradually heated with said charge during passage through said horizontal electrodes.

12. Apparatus for the electrothermic treatment of metalliferous materials comprising a furnace, a pair of horizontal and opposed hollow electrodes, means for inducing an electric arc between said electrodes for heating and melting said materials, means for feeding said materials through said electrodes and arc into said furnace, means for homogeneously mixing said materials, for admixing gases with said materials, and conducting the whole through a closed passage at an elevated temperature to said feeding means, and means for gathering gases from said furnace and admixing them with said materials between said feed means and said electrodes.

13. Apparatus for the electrothermic treatment of a charge of metalliferous materials comprising a furnace, a hollow electrode extending into said furnace, means for conducting said charge to said hollow electrode including means for homogeneously admixing the materials of said charge, means for forcing said charge through a closed passage to said hollow electrode, means for admixing gases with the charge in said closed passage for increasing the fluency of said charge, and agitator means for maintaining the fluent condition of said charge for passage through said hollow electrode.

14. In combination with a furnace, an electrode extending into said furnace, a carriage for supporting said electrode, and guide means for supporting said carriage for movement in the directions of the electrode axis, said carriage comprising a member for engagement with said guide means, a saddle for supporting said electrode, a member for releasably clamping said electrode against said saddle member, fluid pressure actuated means for effecting movement of said clamping member, and insulating means interposed between said fluid pressure actuated means and said clamping member and between said member for engagement with said guide means and said saddle member.

15. An electrode carriage adapted for movement on a guideway, comprising a carriage guide member for engaging said guideway, a saddle member for receiving the electrode, a clamp member slidable on said saddle member, said saddle and clamp members having cooling means associated therewith, a cross-head affixed to said saddle, spring means disposed between said cross-head and clamp member for pressing the latter into engagement with said electrode, and fluid pressure operated means associated with said cross-head and said clamp member for releasing the clamping engagement of said clamp member with said electrode against the pressure of said spring means.

16. In an electric arc type furnace, a plurality of substantially horizontally disposed electrodes, one of said electrodes being hollow and formed in mated replaceable sections, feed means for forcibly introducing a charge into said hollow electrode and continuously forcing said charge therethrough for discharge into an arc produced between the electrodes, means detachably connecting said feed means to the hollow electrode and means for advancing the hollow electrode to compensate for erosion without disconnecting said hollow electrode from the feed means.

17. In an electric arc type furnace, a plurality of substantially horizontally disposed hollow electrodes, said electrodes being formed in mated replaceable sections, feed means for forcibly introducing charges into the electrodes and continuously forcing the charge therethrough for discharge into an arc produced between the electrodes, means detachably connecting said feed means to said electrodes and means for advancing the hollow electrodes to compensate for erosion without disconnecting the electrodes from the feed means.

18. In an electric arc type furnace, a plurality of substantially horizontally disposed electrodes, one of said electrodes being hollow and formed in mated replaceable sections, feed means for forcibly introducing a charge into said electrodes and continuously forcing said charge therethrough for discharge into an arc produced between the electrodes, said feed means and hollow electrode having a detachable connection providing for relative movement between the feed means and hollow electrodes, and means for advancing the hollow electrode independently of the feed means to compensate for erosion without disconnecting said hollow electrode from the feed means.

SYDNEY T. WILES.